United States Patent
Kane et al.

[11] Patent Number: 5,903,390
[45] Date of Patent: May 11, 1999

[54] TWO PORT NONLINEAR JOINT TRANSFORM CORRELATOR

[75] Inventors: Jonathan S. Kane, Somerville; Charles L. Woods, Stow, both of Mass.; Jehad Khoury, Concord, N.H.; George Asimellis, Medford, Mass.

[73] Assignee: The United States of America as represented by the Secretary of the Air Force, Washington, D.C.

[21] Appl. No.: 08/726,253

[22] Filed: Oct. 4, 1996

[51] Int. Cl.$^6$ .............................. G02B 27/46; G06E 3/00; G06K 9/76

[52] U.S. Cl. .............................. 359/561; 359/559; 359/7; 359/29; 364/822; 382/210

[58] Field of Search .................................. 359/7, 29, 559, 359/561, 562; 364/822; 382/210, 211, 212, 278

[56] References Cited

U.S. PATENT DOCUMENTS

| | | |
|---|---|---|
| 5,337,170 | 8/1994 | Khoury et al. ............................... 359/7 |
| 5,493,444 | 2/1996 | Khoury et al. ........................... 359/559 |
| 5,604,634 | 2/1997 | Khoury et al. ........................... 359/559 |

*Primary Examiner*—Jon W. Henry
*Assistant Examiner*—Audrey Chang
*Attorney, Agent, or Firm*—Robert L. Nathans

[57] ABSTRACT

An all optical photorefractive holographic joint transform correlator provides a first correlation plane output port using two-beam coupling, and a second correlation plane output port employing four-wave mixing. With appropriate input beam intensity ratios, the first port output is capable of high discrimination, while simultaneously the second port offers a low discrimination output.

20 Claims, 3 Drawing Sheets

| | TWO BEAM PORT | FOUR BEAM PORT |
|---|---|---|
| $I_1 \gg I_3$<br>$I_1$ PUMP $I_3$ | VH | VH |
| $I_1 \gg I_3$<br>$I_3$ PUMP $I_1$ | VH | VH |
| $I_1 = I_3$<br>$I_3$ PUMP $I_1$ | H | H |
| $I_1 = I_3$<br>$I_1$ PUMP $I_3$ | H | L |

# TWO PORT NONLINEAR JOINT TRANSFORM CORRELATOR

STATEMENT OF GOVERNMENT INTEREST

The invention described herein may be used by or for the Government for governmental purposes without the payment of any royalties thereon.

BACKGROUND OF THE INVENTION

The present invention relates to the field of joint transform image correlators for identifying input images of objects being viewed.

The joint transform correlator is one of the most convenient devices for correlating two images since there is no need to fabricate separate holographic filters such as the matched filter or the phase only filter. The classical joint transform correlator requires a quadratic processor in the Fourier plane. In the last decade it has been shown that it is possible to introduce nonlinearities in the image plane in order to improve the performance of these correlators. The joint transform correlator has been implemented in two ways: The first approach is based on using a camera as the square law receiver, a computer for digital image enhancement as well as for interfacing with other spatial light modulators, and finally a spatial light modulator to receive the processed data from the computer. The second approach is based on using all optical spatial light modulators.

There are two distinct types of correlators, the matched filter correlator and the binary phase only filter correlator. The matched filter correlator is less sensitive to distortions in the inputs, and therefore it performs better in the presence of noise. However, at the same time, it is insensitive to small differences between the input and target image. In contrast, the binary phase-only or BPOF correlator is highly sensitive to small changes in the input; however, this same sensitivity leads to lower performance in the presence of noise. Therefore, what is needed is a correlator that can simultaneously combine the advantages of good noise performance accompanying low discrimination, with high sensitivity associated with high discrimination.

BRIEF SUMMARY OF THE INVENTION

Thus, it is an object of the present invention to provide a new type of correlator that can be used for target tracking and detection, and which simultaneously allows for both low and high discrimination of input objects. Thus both inter-class (between different classes) and intra-class (within a class) discrimination can be carried out simultaneously. For example, one port could be used to determine whether the image being viewed is a tank, and the second port could tell the particular type of tank being viewed. The correlator can also be employed for detecting signals which are embedded in different noisy environments. The correlator of the present invention has features of two prior inventions assigned to the Secretary of the Air Force. Regarding the first invention, we reported the two beam coupling correlator, based on the limiting square law receiver. See U.S. Pat. No. 5,493,444 to Khoury et al. entitled "Two-Beam Coupling Nonlinear Joint Transform Correlator." In a second invention, we reported on a four-wave mixing correlator as indicated in FIG. 1b. See allowed patent application Ser. No. 08/300,692, entitled "All Optical Nonlinear Joint Transform Correlator." In the present invention, we employ the simultaneous use of architectures from each of these correlators, so that two separate output ports are provided wherein both high and low discrimination correlator outputs can be simultaneously examined in a convenient manner, to obtain the benefits described above.

BRIEF DESCRIPTIONS OF THE DRAWINGS

Other features and advantages of the invention will become apparent upon study of the following detailed description, taken in conjunction with the drawings in which:

FIGS. 1(a) and 1(b) disclose aspects of the aforesaid two prior art image correlators;

DETAILED DESCRIPTION OF PREFERRED EMBODIMENTS OF THE INVENTION

Figure 1A:
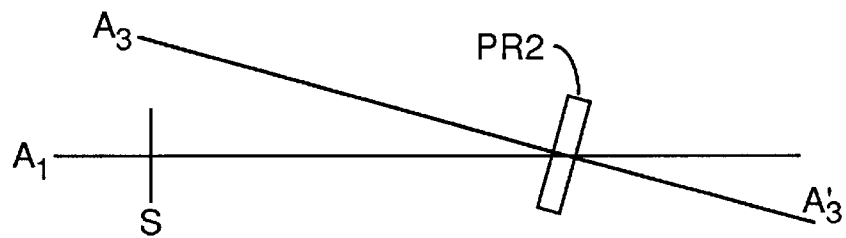

The correlator architecture of the present invention centers around the use of a photorefractive crystal PR 2. In our apparatus, the crystal was barium titanate; however, any real-time holographic coupling media can be used. In prior art FIG. 1a, the crystal is setup in a two beam coupling experiment. In this particular architecture, with a proper orientation of the crystal, beam A1 will pump beam A3 such that the output in the low-coupling limit, is given by:

$$A_3 = A_3 + \frac{CA_3 |A_1|^2 |S|^2}{I_o}$$

where $I_o$ is the total intensity and is given by $|A_1|^2|S|^2 + |A_3|^2$. In other words, the signal given by S is squared in the output, hence the square law behavior.

Figure 1B:
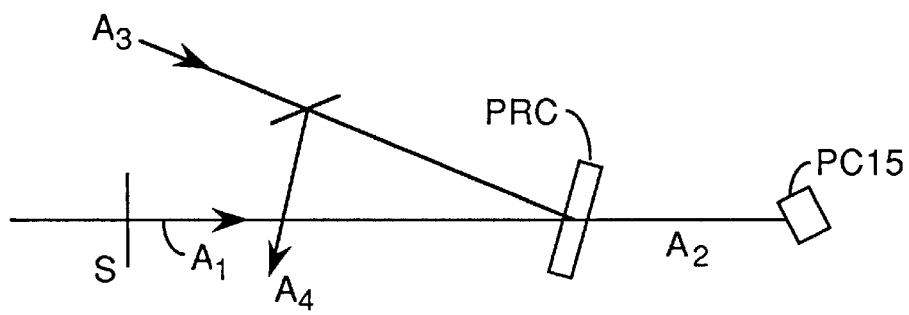

In prior art FIG. 1b, the crystal is setup as part of a four wave mixing architecture. In this case A1 interferes with beam A3 and the resultant interference pattern is readout by phase conjugate beam A2 emerging from phase conjugator 15, such that the output phase conjugate has the form (in the low coupling limit):

$$A_4 = \frac{CA_3 |A_1|^2 |S|^2}{I_o}$$

Once again note that the signal S has been squared in the output. The two above equations are therefore nearly identical, with the only difference that the first equation has the addition bias term of A3.

Figure 2:
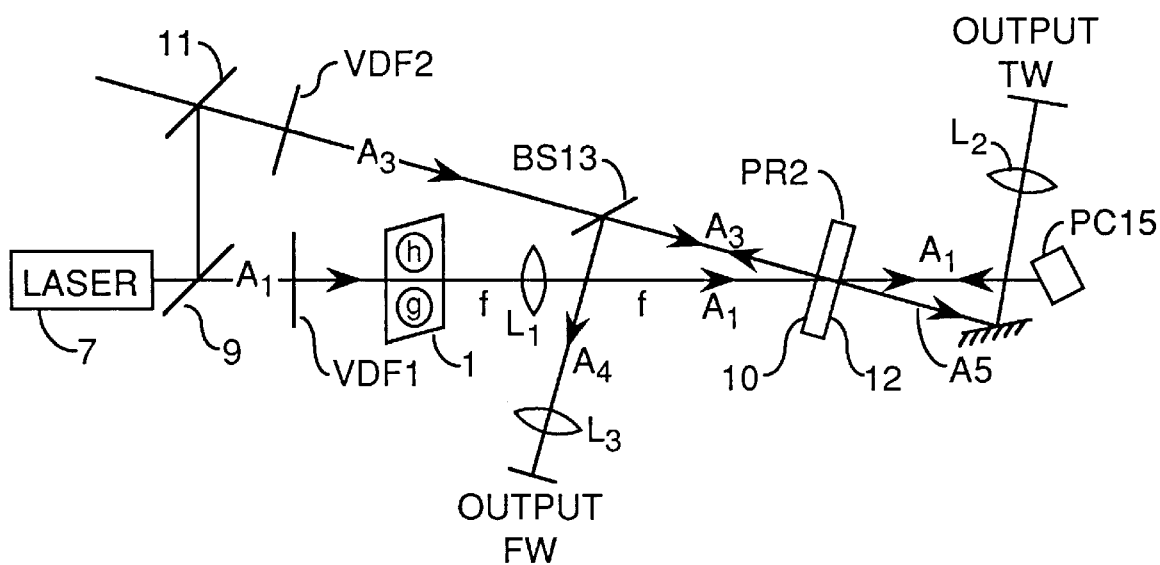
FIG. 2 illustrates a preferred embodiment of the present invention.

The joint transform correlator architecture depends upon having a square law device in the Fourier plane. In addition, the phase extraction correlation operation requires saturation which are characteristics of the two above nonlinear transfer functions. These two transfer functions have been utilized by the aforesaid two prior art correlators. FIG. 2 shows the presently preferred embodiment of the invention where both of the prior architectures have been combined with a crystal that has a large coupling coefficient. As shown in the figure, there are two separate outputs each demonstrating different performance depending on the coupling coefficient and the beam intensity ratios between A1 and A3. The intensity of these beams are adjusted by manipulating variable density filters VDF1 and VDF2.

Input A1 produced by laser 7, passes through a signal mask 1 containing g and h, representing the input scene being viewed and the reference image retrieved from an image library to be compared with the input image. The Fourier transform, produced by transform lens L1, appears at the photorefractive crystal PR 2. The input reference beam is directed at PR 2 via beam splitter 9, mirror 11, and beamsplitter 13. There are several different processes that occur simultaneously at the crystal due to the coupling between input beams A1 and A3. Output plane FW displays the output of the four wave mixing correlator as discussed above while Output TW shows the output from the two wave mixing correlator simultaneously.

Figure 5:
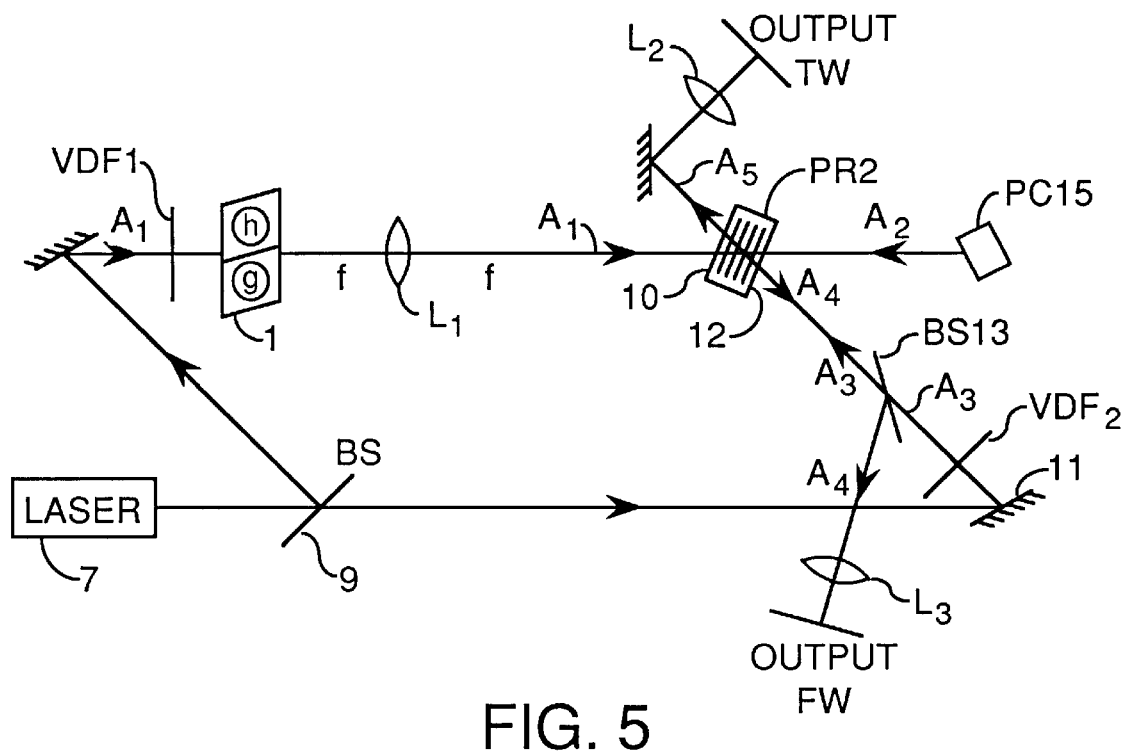
FIG. 5 illustrates a variation of the embodiment of FIG. 2 employing reflection geometry.
Figure 6:
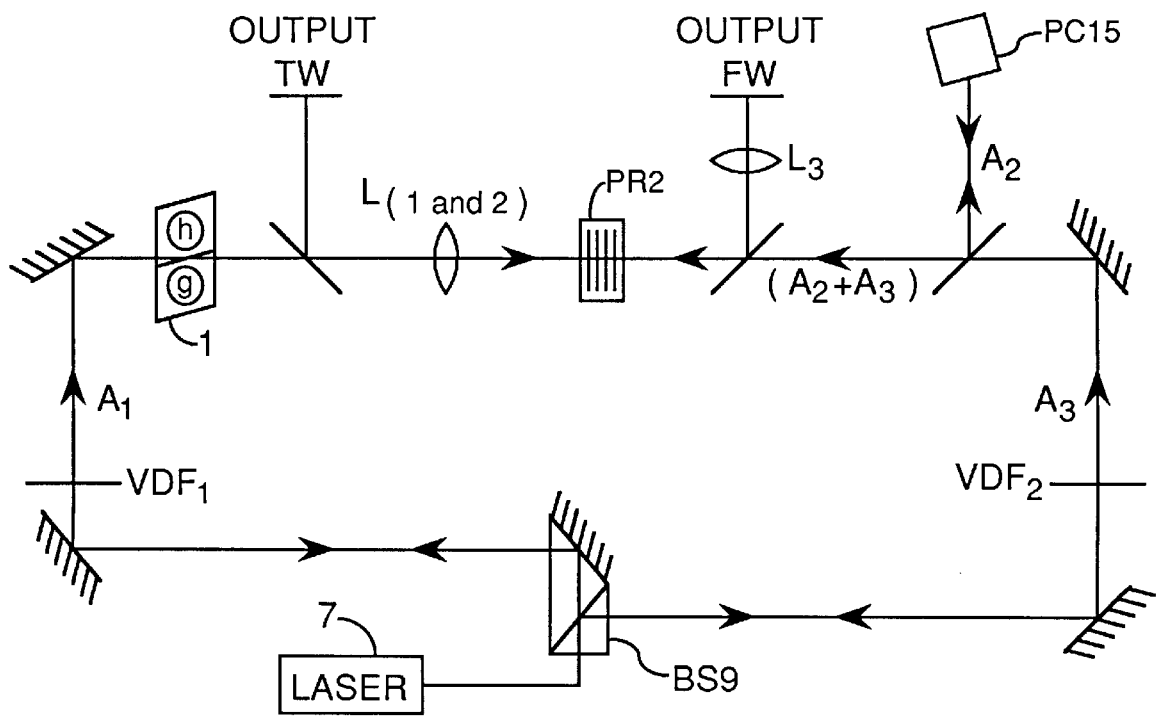
FIG. 6 illustrates a variation of the embodiment of FIG. 2 employing a counter propogation geometry.

In this embodiment, a first crystal output beam A4 emerges from the crystal PR 2 at a first side 10 of PR2 before inverse transformation by second transform lens L3 to produce output FW, whereas a second crystal output beam A5 emerges from a second side 12 of the crystal before inverse transformation by the third transform lens L2 to produce output TW as shown. In an equivalent reflection geometry embodiment shown in FIG. 5, the process is very similar except that the aforesaid A5 beam rebounds from the first side 10 of PR 2 rather than emerging from the second side 12 as in FIG. 2. Beamsplitter 13 and transform lens L3 optically coact with the second side 12 of the crystal rather than the first side as in FIG. 2. FIG. 6 functions as before but illustrates a counter propogation geometry which is equivalent to the reflection geometry embodiment of FIG. 5 and the transmissive embodiment of FIG. 2. The same components have been similarly labelled in these figures. Since these variations are obvious rearrangements of FIG. 2 as understood by the skilled worker in the art, they will not be further described in the interests of economy and brevity.

Due to the high coupling coefficient, the behavior of both types of correlators will vary, depending on the beam intensity ratio A1/A3, and whether the coupling coefficient, which is a function of the material, is positive or negative. As understood by the worker in the art, a high coupling coefficient will result in a transfer of substantial energy between beams in the crystal, in contrast with a low coupling coefficient. If the coupling coefficient is positive, the reference beam will amplify the signal beam and vice versa for a negative coefficient. By carefully controlling the beam intensity ratio, one output can be made to be highly discriminating while the other one is insensitive to minor variations, and thus has low discrimination.

Figures 3, 4:
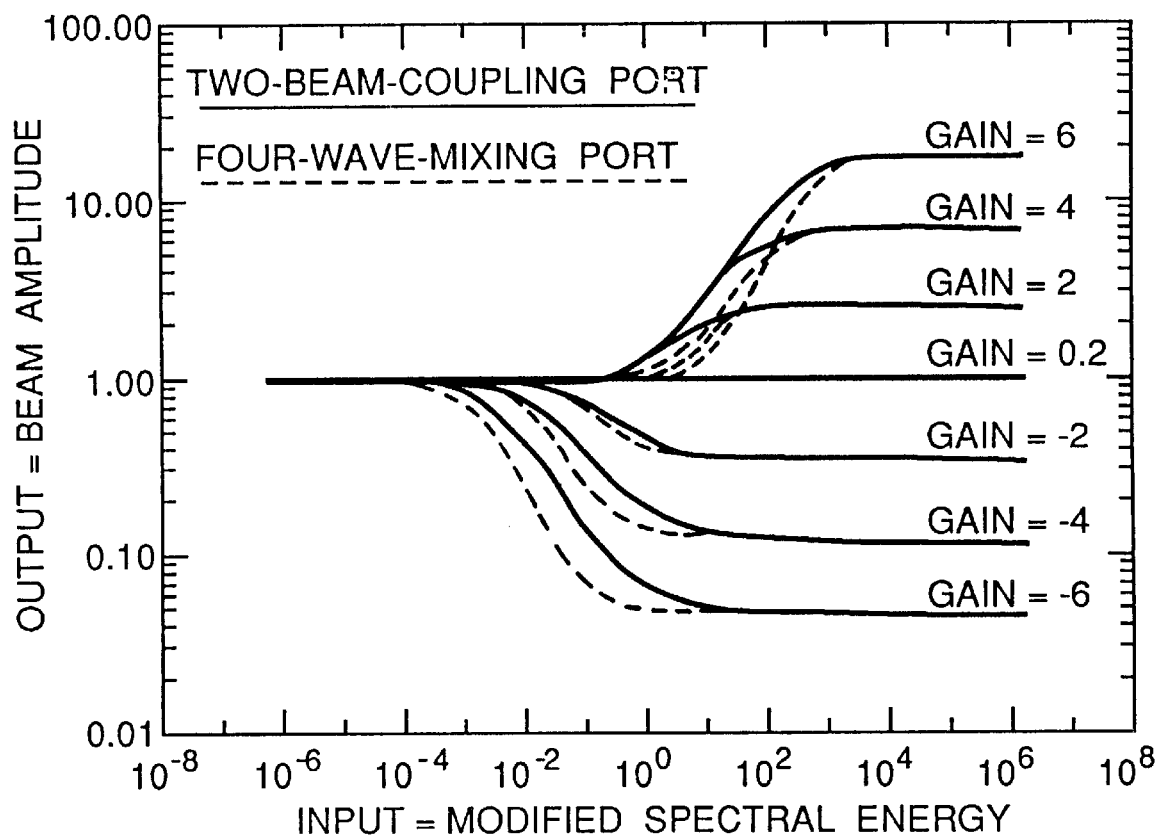
FIGS. 3 and 4 illustrate a set of graphs and a table respectively, which may aid in further understanding the results produced by the invention.

A set of transfer functions is shown in FIG. 3. In the figure, a plot of output intensity as a plot of input intensity is shown for both the four wave mixing port and the two wave mixing port. The solid line represents the two-beam coupling port TW and the dotted line the four-wave mixing port FW. Note that the two ports do not have the same curves. This is an important aspect of the invention. By fixing the input intensity, the output intensity will be different for the two ports. This behavior is what leads to the aforesaid different types of discrimination of the overall device. For example, if beam intensity I1 of beam A1 is set to be approximately equal to 10 times the intensity I3 of beam A3, and thus the beam intensity ratio I1/I3 is 10, the two beam coupling port has a transfer function similar to that found in a phase only filter and hence that output is highly discriminating, while simultaneously, the four-wave mixing port shows quadratic behavior, and hence will perform like a matched filter having low discrimination.

It may be noted that when the beam ratio is very high, both ports will have the same behavior and behave as phase extraction correlator filters. In contrast, when the beam ratio is extremely low, both ports have quadratic nonlinearities and behave as matched filters. In the intermediate beam ratios, the two ports will behave differently. A summary of the different beam intensity ratios and the resulting (H for high and L for low) discrimination is shown in FIG. 4.

Since variations in the foregoing arrangements will become apparent to the skilled worker in the art, the scope of the invention is to be defined solely by the terms of the following claims and art recognized equivalents thereof.

We claim:

1. A two port real-time holographic nonlinear joint transform correlator comprising:

(a) joint image production means for producing a signal input beam having a joint image of an intelligence bearing reference image and a signal image;

(b) first Fourier transform means for producing a joint transform spectra (JTS) of the signal beam at a Fourier transform plane;

(c) a real-time holographic coupling member positioned at said Fourier transform plane for receiving said JTS;

(d) reference input beam means illuminating said real-time holographic coupling member with a reference beam coherent with said signal beam;

(e) phase conjugating means for forming a counter-propagating phase conjugate JTS in said holographic coupling member to produce a first output beam therefrom emerging from a first side of said holographic coupling member;

(f) a second Fourier transform means for inverse Fourier transforming said first output beam, thereby to produce a low discrimination four wave mixing correlation output from said joint transform correlator; and (g) a third Fourier transform means for inverse Fourier transforming a second output beam emerging from a second side of said holographic coupling member, opposite said first side, thereby to produce a high discrimination two wave mixing correlation output, in addition to said low discrimination four wave mixing correlation output.

2. The correlator of claim 1 wherein said holographic coupling member comprises a material having a high coupling coefficient.

3. The correlator of claim 2 wherein said holographic coupling member comprises a photorefractive crystal.

4. The correlator of claim 3 wherein said photorefractive crystal comprises barium titanate.

5. A two port real-time holographic nonlinear joint transform correlator comprising:

(a) joint image production means for producing a signal input beam having a joint image of an intelligence bearing reference image and a signal image;

(b) first Fourier transform means for producing a joint transform spectra (JTS) of the signal beam at a Fourier transform plane;

(c) a real-time holographic coupling member positioned at said Fourier transform plane for receiving said JTS;

(d) reference input beam means illuminating said real-time holographic coupling member with a reference beam coherent with said signal beam;

(e) phase conjugating means for forming a counter-propagating phase conjugate JTS in said holographic coupling member to produce a first output beam therefrom emerging from a first side of said holographic coupling member;

(f) a second Fourier transform means for inverse Fourier transforming said first output beam, thereby to produce a low discrimination four wave mixing correlation output from said joint transform correlator;

(g) a third Fourier transform means for inverse Fourier transforming a second output beam emerging from a second side of said holographic coupling member, opposite said first side, thereby to produce a high discrimination two wave mixing correlation output, in addition to said low discrimination four wave mixing correlation output; and (h) beam intensity adjustment means for adjusting the relative intensities of the signal input beam with respect to the reference input beam.

6. The correlator of claim 5 wherein said holographic coupling member comprises a material having a high coupling coefficient.

7. The correlator of claim 6 wherein said material comprises a photorefractive material.

8. The correlator of claim 7 wherein said beam intensity adjustment means causes the signal beam to have an intensity of about ten to twenty times the intensity of the reference beam.

9. The correlator of claim 6 wherein said beam intensity adjustment means causes the signal beam to have an intensity of about ten to twenty times the intensity of the reference beam.

10. The correlator of claim 5 wherein said beam intensity adjustment means causes the signal beam to have an intensity of about ten to twenty times the intensity of the reference beam.

11. A two port real-time holographic nonlinear joint transform correlator comprising:

(a) joint image production means for producing a signal input beam having a joint image of an intelligence bearing reference image and a signal image;

(b) first Fourier transform means for producing a joint transform spectra (JTS) of the signal beam at a Fourier transform plane;

(c) a real-time holographic coupling member positioned at said Fourier transform plane for receiving said JTS;

(d) reference input beam means illuminating said real-time holographic coupling member with a reference beam coherent with said signal beam;

(e) phase conjugating means for forming a counter-propagating phase conjugate JTS in said holographic coupling member to produce a first output beam therefrom emerging from said holographic coupling member;

(f) a second Fourier transform means for inverse Fourier transforming said first output beam, thereby to produce a low discrimination four wave mixing correlation output from said joint transform correlator; and (g) a third Fourier transform means for inverse Fourier transforming a second output beam emerging from said holographic coupling member, thereby to produce a high discrimination two wave mixing correlation output, in addition to said low discrimination four wave mixing correlation output.

12. The correlator of claim 11 wherein said holographic coupling member comprises a material having a high coupling coefficient.

13. The correlator of claim 12 wherein said holographic coupling member comprises a photorefractive crystal.

14. The correlator of claim 13 wherein said photorefractive crystal comprises barium titanate.

15. A two port real-time holographic nonlinear joint transform correlator comprising:

(a) joint image production means for producing a signal input beam having a joint image of an intelligence bearing reference image and a signal image;

(b) first Fourier transform means for producing a joint transform spectra (JTS) of the signal beam at a Fourier transform plane;

(c) a real-time holographic coupling member positioned at said Fourier transform plane for receiving said JTS;

(d) reference input beam means illuminating said real-time holographic coupling member with a reference beam coherent with said signal beam;

(e) phase conjugating means for forming a counter-propagating phase conjugate JTS in said holographic coupling member to produce a first output beam emerging from said holographic coupling member;

(f) a second Fourier transform means for inverse Fourier transforming said first output beam, thereby to produce a low discrimination four wave mixing correlation output from said joint transform correlator;

(g) a third Fourier transform means for inverse Fourier transforming a second output beam emerging from said holographic coupling member, thereby to produce a high discrimination two wave mixing correlation output, in addition to said low discrimination four wave mixing correlation output; and (h) beam intensity adjustment means for adjusting the relative intensities of the signal input beam with respect to the reference input beam.

16. The correlator of claim 15 wherein said holographic coupling member comprises a material having a high coupling coefficient.

17. The correlator of claim 16 wherein said material comprises a photorefractive material.

18. The correlator of claim 17 wherein said beam intensity adjustment means causes the signal beam to have an intensity of about ten to twenty times the intensity of the reference beam.

19. The correlator of claim 16 wherein said beam intensity adjustment means causes the signal beam to have an intensity of about ten to twenty times the intensity of the reference beam.

20. The correlator of claim 15 wherein said beam intensity adjustment means causes the signal beam to have an intensity of about ten to twenty times the intensity of the reference beam.

\* \* \* \* \*